United States Patent [19]
Jändel

[11] Patent Number: 6,097,793
[45] Date of Patent: Aug. 1, 2000

[54] WWW-TELEPHONY INTEGRATION

[75] Inventor: Magnus Jändel, Upplands Väsby, Sweden

[73] Assignee: Telefonaktiebolaget LM Ericsson, Stockholm, Sweden

[21] Appl. No.: 09/104,783

[22] Filed: Jun. 26, 1998

[30]     Foreign Application Priority Data

Jun. 22, 1998  [SE]  Sweden ................................. 9802225

[51] Int. Cl.$^7$ .................................................. H04M 11/00
[52] U.S. Cl. ........................................ 379/93.23; 379/201
[58] Field of Search .................................. 370/352, 389, 370/401, 404, 427; 379/88.17, 93.23, 201

[56]          References Cited

U.S. PATENT DOCUMENTS

| | | | |
|---|---|---|---|
| 5,457,738 | 10/1995 | Sylvan ............................... | 379/201 X |
| 5,742,670 | 4/1998 | Bennett ................................ | 379/142 |
| 5,907,547 | 5/1999 | Foldare et al. ..................... | 379/309 X |

OTHER PUBLICATIONS

Eva Sallander Gustafsson, "Web Telephones Competition Description", Apr. 30, 1998, pp. 1–11.
William Stallings, "Data and Computer Communications", 1997, pp. 649–650, and 719.
"AT&T Interactive Answers Service", AT&T 1997.
"Online Phone Book/Dialer/Call Request", AT&T 1996.
Studentlitteratur, Lund, 1996, pp. 290–299.

*Primary Examiner*—Creighton Smith
*Attorney, Agent, or Firm*—Burns, Doane, Swecker & Mathis, L.L.P.

[57]         ABSTRACT

A telecommunications system (TS2) comprises a data network (IN1) and a telephone network (PSTN1) to which subscribers (AB1, AB2) are connected. Each subscriber has a telephone (T1, T2) with A-number transfer and a computer terminal (D1, D2) connected through access devices (ACD1, ACD2). A server (SR1) holding the subscribers' home pages and a directory (DS1) holding different identities (TELO1, TELO2, TELH2, EMAILO1, URL2) of the subscribers is connected to the data network. The directory (DS1) is public, which enables the subscribers to enter their respective identities and obtain the identities of other subscribers. One subscriber (AB1) calls the other (AB2) on his home telephone number (TELH2), which is transferred to the computer terminal (D1) of the caller (AB1). The subscribers (AB1, AB2) can talk, the caller (AB1) can obtain the identities of the called party (POSTS2) through his computer terminal (D1) from the directory (DS1) and use this information, for example, to open the called party's home page on the server (SR1). By A-number transfer the called party (AB2) can obtain the identities (POSTS1) of the caller (AB1), in a corresponding way, to his computer terminal (D2) from the directory (DS1). This way of communicating and keeping a directory is possible because the directory (DS1) is public. Advantages are, i.a. that the communication is simplified and the identities of other subscribers can be obtained easily.

29 Claims, 4 Drawing Sheets

WWW-TELEPHONY INTEGRATION

TECHNICAL FIELD

The present invention relates to an apparatus and a method in a telecommunications system for both telephony and data transfer. The different names and other records in the telecommunications system belonging to a subscriber can be obtained knowing one of the records and also the subscriber's home page in the data network can reached.

STATE OF THE ART

In telecommunications there is a desire for two subscribers to be able to talk to each other on the phone while images of various types of information are shown to at least one of the subscribers on his computer screen. An example of a situation in which this can be used is when a person is called by a company trying to sell something. The goods may be presented on the company's home page on the internet and the sales person can show the items to the customer through the internet. A system that can perform this and similar services is described in the document "AT&T Interactive Answers Service", AT&T 1997. The system can be purchased by a company and the document describes that the system has a directory of computer addresses and telephone numbers. Using these, sellers and buyers can get in touch with each other in a simple way and the buyer can request to be called. The system is limited in the sense that the company owns the directory.

In Anders Hellman, Gudrun Bager: "Att förstå telekommunikation", Student-litteratur, Lund 1996, chapter 6.2.4, universal personal telecommunications (UTP) is discussed. This concept implies that each subscriber has a personal subscription with a unique number for each subscriber. Wherever the subscriber is located, he can be reached on his unique number. The functions that may be implemented for universal personal telecommunications are discussed and it is mentioned that data services can become available as well. How to achieve this is not described in any detail.

Mirabilis LTD has made available a publication called "Online Phone Book/Dialer/Call". The publication discloses how the internet is utilized to obtain the phone number on which a subscriber can be reached and how a call is then requested to this number. A conventional telephone is used to make the call. One or both subscribers can be pay-phones, computer programs, agents etc.

SUMMARY OF THE INVENTION

The present invention attacks the following problem: Any two subscribers in a telecommunications system can communicate by means of a telephone and a data connection. The subscribers only know one or a couple of each other's identities in the telecommunications network, for example a telephone number or an e-mail address. By means of one of the known identities they are to be able to obtain each other's remaining identities.

Another problem is that one subscriber wishes to be reached on a particular one of his identities, for example on a particular telephone number, without having to inform the other subscriber specifically.

Yet another problem is that one of the subscribers is to be able to reach the other subscriber's home page in the data network even when the address to the subscriber's home page is unknown to the first subscriber.

The problem is solved according to the invention by the telecommunications network having a public directory, accessible to all subscribers in the telecommunications system, and by connected telephones offering calling line identification. The subscriber also has a computer terminal to which his phone is connected and can exchange telephone numbers both to and from the computer terminal. The subscribers themselves can enter records into the directory, for example their different identities, such as telephone number or e-mail address. When one subscriber looks for another one by one of this other subscriber's identities, the first subscriber gets access to the rest of the other subscriber's records. When a connection has been set up between the subscribers, in one embodiment the second subscriber can also be given access to the records of the first subscriber from the directory.

In order to be reached on a certain identity, the subscriber chooses to activate this identity. For example, the subscriber can choose between activating his home telephone number or his telephone number at work, and this activation can be made each time or according to a schedule entered into the computer terminal of the subscriber.

The subscribers can also enter information into the directory so that their respective home page can be reached by the other subscribers. This is possible since the directory is public.

In somewhat more detail, the problem is solved by the subscribers being connected to a computer network in the telecommunications system through an access device. A telephone connection can be set up through the computer network or alternatively through the access device and from there through a separate telephone network. Each subscriber's telephone and the data communications equipment are connected to each other and can exchange telephone numbers bi-directionally. The public directory is connected to the computer network and thus connected both to the subscribers' data communications equipment and to the telephone, if available, through the access device. The directory contains the records of, among other things, the different identities of each subscriber, which may be entered by the subscriber himself. The telephone connections have calling line identification so that, according to one embodiment, a called subscriber can reach the directory and obtain the identities of the caller by means of the caller's telephone number. The data information, according to one embodiment, can be transferred by means of signalling in the telephone network, which can then be seen as an alternative data network.

One of the subscribers having several identities of the same kind, for example several telephone numbers or several e-mail addresses, can himself reach the directory and activate the identity or identities on which he wishes to be reached. When the subscriber is called, for example by phone, the caller is connected to the activated telephone number. The connection to the activated identity is made independent of which one of the corresponding identities was used by the caller.

In the directory there are identities for the so-called Universal Resource Locator (URL) of the subscribers, which is an address of a web page. By means of this address URL the home pages of the subscribers can be retrieved from a data base located anywhere in the data network. This is possible since the directory is public. In this way, one subscriber can reach the home page of another subscriber even if only one of the identities of the subscriber is known. A more general alternative to the address URL is an address called Universal Resource Identifier (URI) that can also be stored in the directory.

An object of the present invention is therefore to enable a subscriber in the telecommunications system to obtain the identities of another subscriber in the system even if only one of the identities is known.

Another object is that a subscriber having several identities at the same time is to be able to decide on which one of these he is to be reached.

Yet another object is that one of the subscribers is to be able to reach the home pages of the other subscribers without knowing their home page addresses beforehand.

The invention has the advantage that all subscribers in the telecommunications network can have access to the records of the other subscribers if only one identity for each subscriber is known. The identities can be shown, for example, on the computer screens of the subscribers and never have to be given orally on the phone. This is an advantage especially regarding e-mail addresses and the like, since these addresses are long and have to be absolutely correct to work. A subscriber having several identities of the same kind can activate one of these identities on which to be reached. It is also possible to reach the home pages of the subscribers without knowing the home page addresses beforehand.

BRIEF DESCRIPTION OF THE DRAWINGS

The invention will be described in more detail in the following, with reference to the appended drawings, in which.

DESCRIPTION OF PREFERRED EMBODIMENTS

Figure 1:
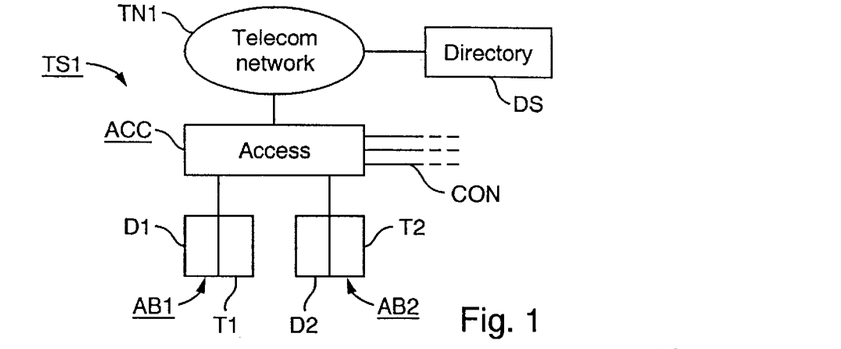
FIG. 1 is an overall block diagram of the invention.

First, the invention will be described in general terms with reference to FIG. 1.

This figure shows a simple block diagram of a telecommunications system TS1 comprising a telecommunications network TN1, through which spoken information as well as data information can be transferred. A first and a second subscriber AB1 and AB2, respectively, are connected to the telecommunications network by means of an access device ACC, which can also connect several subscribers to the telecommunications network TN1. This is shown schematically by means of connections CON. Each subscriber has an apparatus for data communication, comprising data terminals D1 and D2, respectively, with monitors, and a telephone T1 and T2, respectively. The computer terminal and the telephone of each subscriber can be two separate units or one unit. Regardless of the implementation, they can transmit data to each other. To the telecommunications network a public, i.e. commonly available, directory DS is connected, comprising a number of records for each subscriber. Among these records are different identities for the subscribers and passwords. Examples of such identities are unique user identities, telephone numbers and e-mail addresses. Each of the subscribers AB1 and AB2 thus has a set of such identities in the directory DS. The contents of the records to be found in the directory is determined by each subscriber for himself, and the subscriber can also enter information himself. As mentioned, the directory is public and the subscribers can read each other's identities on their monitors. The term "public" implies that the directory DS is available to a defined group of subscribers.

A general example of how the apparatus can be used for communication will be described in the following. The subscriber AB1 has a document on his computer terminal D1 that he wants to show to and discuss with the subscriber AB2. The subscriber AB1, who only has access to the phone number of the subscriber AB2, calls the subscriber AB2. The subscriber AB1 connects to the subscriber AB2 by his telephone T2 through the telecommunications network TN1 in a way known in the art. By means of his computer terminal D1 the subscriber AB1 can access the directory DS through the telecommunications network TN1 and finds there the e-mail address of the subscriber AB2 by means of his telephone number. The subscriber AB1 now transmits his document to the computer terminal D2 of the subscriber AB2 by means of this address.

In a corresponding way the subscriber AB2 can transmit a document to the subscriber AB1. It is assumed that the telecommunications system TS1 has calling line identification so that the telephone number of the calling subscriber AB1 is transmitted to the telephone T2 of the subscriber AB2. This telephone number is transferred to the computer terminal D2 and by means of this number the subscriber AB2 can look up the e-mail address of the subscriber AB1 in the directory DS and transmit his document to the subscriber AB1 by e-mail.

Figure 2:
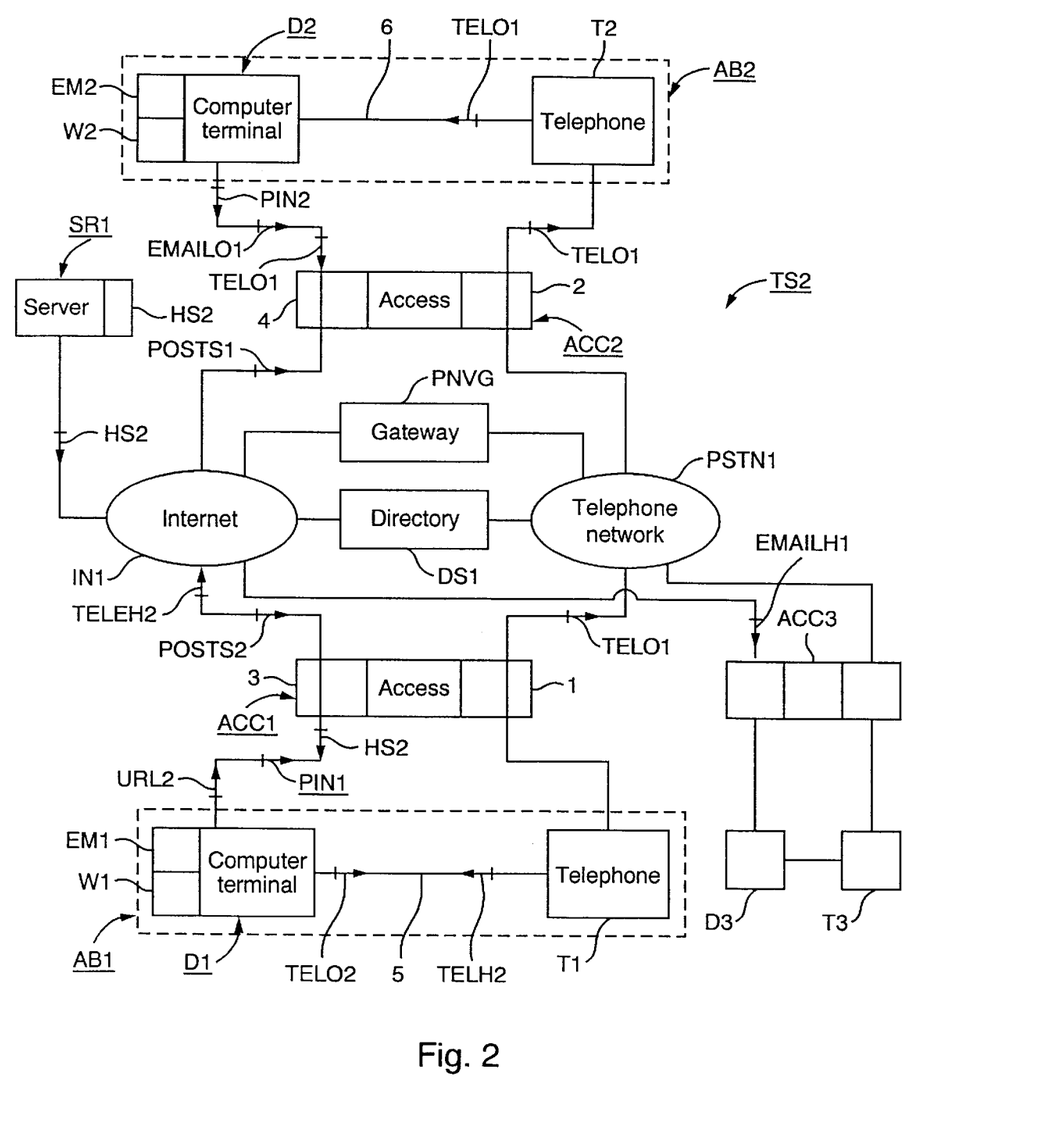
FIG. 2 is a more detailed block diagram of the invention.
Figure 3:
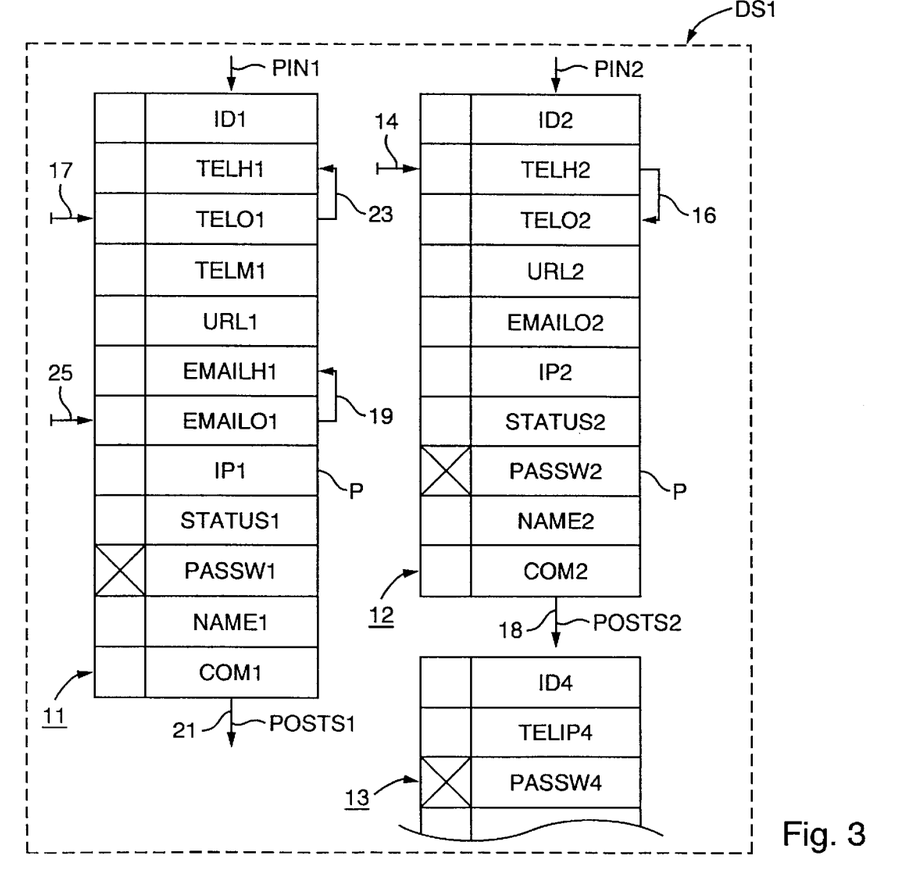
FIG. 3 is a view of a data directory.
Figure 4:
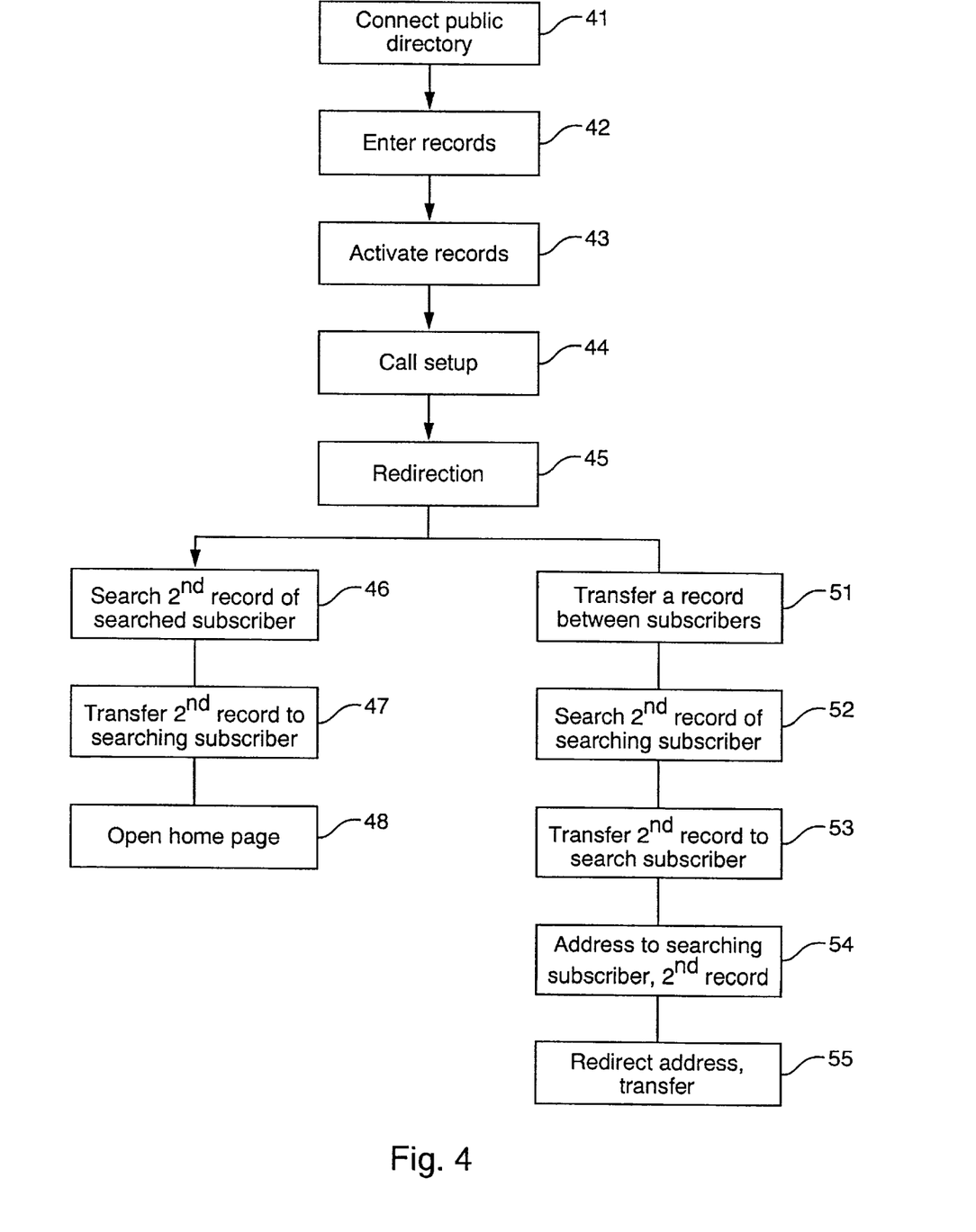
FIG. 4 is a flow chart of an inventive method.

With reference to FIGS. 2, 3 and 4, some embodiments of the invention will be described in more detail. FIG. 2 shows a telecommunications system TS2 to which the two subscribers AB1 and AB2 are connected. The system TS2 comprises a telephone network which in the embodiment is a public, terrestrial telephone network PSTN1. The system TS2 also comprises a data communication network, which in the example is an internet IN1. The two networks are interconnected through a gate-way PNVG (Public Network Voice Gateway).

The first subscriber AB1 is connected to the networks in his office through an access device ACD1, comprising a connection device 1 common in the art, for connecting the subscriber's telephone T1 to the telephone network PSTN1. The access device also comprises a modem 3 for connecting the computer terminal D1 of the subscriber AB1 to the internet IN1. The telephone T1, which is a common telephone for connection to the public network PSTN1, has calling line identification, i.e. the phone number of a calling subscriber is transferred to the telephone T1. In the computer terminal D1, programs are installed that are needed for data communication, among other things, programs for the handling of e-mail EM1 and a web browser W1. The telephone T1 has a connection 5 to the computer terminal D1, and telephone numbers, e.g. calling line identity information or dialled telephone numbers, can be exchanged between the telephone T1 and the computer terminal D1.

The subscriber AB1 is connected to the telecommunications networks PSTN1 and IN1 at home as well. This is shown briefly in FIG. 2 by an access device ACD3, through which a computer terminal D3 is connected to the internet IN1 and a telephone T3 is connected to the telephone network PSTN1.

The second subscriber AB2 is connected in a corresponding way through an access device ACD2. This access device comprises a connection 2, common in the art, for connecting the telephone T2 to the telephone network PSTN1, and a modem for connecting the computer terminal D2 to the internet IN1. The telephone T2 also offers calling line identification and the computer terminal D2 has the programs needed for data communication, among other things, programs for the handling of e-mail EM2 and a web browser W2. The telephone T2 has a connection 6 to the computer terminal D2, through which telephone numbers can be exchanged.

To the internet IN1, a public directory service DS1 has been connected, which is shown in more detail in FIG. 3. Each subscriber who so wishes has a sub-directory of his own in this directory comprising a number of records P. The first subscriber AB1 thus has a subdirectory I1, comprising the following records:

A unique identification ID1, e.g. a unique name of an ID-number.

Telephone number TELH1 to the subscriber's home telephone T3, telephone number TELO1 to the subscriber's office telephone T1 and his mobile telephone number TELM1. The subscriber can activate the number on which he wishes to be reached.

A URL address URL1, i.e. an address to information in the form of pictures and text, e.g. a home page.

An e-mail address EMAILH1, which is the subscriber's private address, and an e-mail address EMAILO, which is his work address. The subscriber AB1 can himself activate the e-mail address on which he wants to be reached.

A dynamic IP-address IP1, which is an identity of the subscriber and the computer terminal he chooses to use, e.g. the terminal D1 or D3.

Status information STATUS1 showing if the subscriber is logged in.

A password PASSW1 known and seen only by the subscriber AB1. This is indicated in the figure by means of an X in front of the password.

Some information about the subscriber, in the example the subscriber's AB1 name NAME1.

Other information, in the example information about the preferred way of communication COM1.

The second subscriber AB2 has a subdirectory 12 having the following records:

A unique identification ID2.

A home telephone number TELH2 and a telephone number TELO2 to the subscriber's office telephone T2.

A URL address URL2.

An e-mail address EMAILO2 which is the work address of the subscriber.

A dynamic IP-address IP2 of the subscriber and the computer terminal D2 that he chooses to use.

Status information STATUS1.

A password PASSW2.

The subscriber's name NAME2.

Information about the preferred way of communication COM2.

To the internet IN1, a server SR1 is also connected, on which, among other things, the home pages of the subscribers AB1 and AB2 are found. These home pages can be reached through the internet IN1 by means of the URL addresses in the directory DS1. Several servers are connected to the network IN1 and usually different subscribers use different servers. To simplify the description the subscribers AB1 and AB2 use the server SR1.

Each subscriber can enter and also change the information in his subdirectory from his terminal D1 or D2. This operation is possible at any time for all connected subscribers, since the directory DS1 is public. When the subscriber AB1 creates his sub-directory 11, he enters on his computer terminal D1 both the identity ID1 and the password PASSW1, that he chooses himself and that only he knows. He then enters the records that he wants and sends them to his subdirectory 11. The transmitted sets of data are indicated in FIGS. 2 and 3 as PIN1. When the subscriber AB1 wants to change the content of the directory or activate a certain identity, e.g. the office telephone number TELO1, he uses the identity ID1 and the password PASSW1 to access his directory. The subscriber AB2 enters and changes his records in his subdirectory 12 in a corresponding way. The transmitted data is indicated in the figures as PIN2.

The directories and some of the entered records P can be implemented in such a way that the changes are made automatically by the computer terminal or the telephone when they are activated. The automatic change is made by a computer program activated by the subscribers.

In the following, some embodiments will be described illustrating how the invention is used for communication between the two subscribers AB1 and AB2. It should be observed that the directory DS1 is public and the possibilities opened in this way will emerge from the examples.

Telephone call and transfer of home page

The first subscriber AB1 wishes to talk to the second subscriber AB2 on the phone and also wants to see the second subscriber's home page. The situation may be, for example, that the subscriber AB2 sells items that the subscriber AB1, because of his work, wants to discuss and also see pictures of, which are found on the home page of the subscriber AB2. Both subscribers are in their offices. The subscriber AB1, however, only knows one of the phone numbers of the subscriber AB2, the home phone number TELH2. On his computer terminal D1 the subscriber AB1 opens the web browser W1 and on his telephone he dials the number TELH2 to the subscriber AB2. This number is transmitted on the connection 5 to the computer terminal D1 and the subscriber AB1 through the terminal makes a request for the subscriber's AB2 addresses. According to another example the subscriber marks a suitable field in his computerized telephone book, using his mouse, to initiate the call. The web browser W1 automatically searches for the number TELH2 and finds it in the subscriber's AB2 subdirectory 12, as shown by an arrow 14 in FIG. 3. The subscriber AB2 has activated the telephone number TELO2 to his office, as indicated by an arrow 16. This number, together with other records in the directory 12, except the password PASSW2, is transmitted through an output 18 to the computer terminal D1. In the figures, this data is indicated as POSTS2. The telephone number TELO2 is forwarded to the telephone T1, which automatically dials up the subscriber AB2 through the telephone network PSTN1, and a speech connection is then established in a way common in the art between the telephones of the subscribers AB1 and AB2. The subscriber AB1 now has information about the subscriber's AB2 different records in the directory 12 on his computer terminal through the data POSTS2. The records are presented according to the example on the monitor of the terminal D1 as a menu of the web browser W1 with a row of buttons indicating the names of the records, for example, home phone number or e-mail. The subscriber AB1, therefore, does not get information about what the different records look like, only that the records in RECORD2 are found on the computer terminal D1. With his mouse the subscriber AB1 clicks on one of the buttons called "Home page", and the web browser is activated. By means of the address URL2 the web browser finds the subscriber's AB2 home page HS2 on the server SR1 through the internet IN1. The home page is transferred to the computer terminal D1 and presented on the monitor. According to an alternative embodiment the home page is presented on the monitor automatically and the records in the data POSTS2 can be fetched to the screen specifically. The subscribers AB1 and AB2 can now talk to each other by means of telephones T1 and T2, respectively. The subscriber AB1 can also at the same time read the subscriber's AB2 home page with the information about the items on his computer terminal D1.

The connection is established on the basis only of a phone number to the subscriber AB2.

According to an alternative, the telephone connection to the subscriber AB2 is set up directly through the telephone network PSTN1 when the subscriber AB1 dials the home telephone number TELH2. The connection is set up to the subscriber's AB2 office telephone TELO2 using a conventional call-forwarding. The home telephone number TELH2 is transferred to the subscriber's AB1 computer terminal D1 and by means of this number, the home page can be retrieved and shown on the subscriber's AB1 screen as described above.

Telephone call and transfer of e-mail

During the call described above between the subscribers AB1 and AB2, the subscriber AB2 wants to transmit a written document providing more detailed information about the products than what is shown on the home page. As mentioned above, the A-number is transferred between the telephones T1 and T2. Therefore, the subscriber's AB1 telephone number to the office TELO1 is transferred to the subscriber's AB2 telephone T2, as shown in FIG. 2. This telephone number is forwarded through the connection 6 to the subscriber's AB2 computer terminal D2, and the subscriber AB2 makes a request, through his terminal, for the subscriber's AB1 addresses. The web browser W2 in the terminal D2 uses the number TELO1 to search for the subscriber's AB1 subdirectory 11 in the directory DS1, as shown by an arrow 17 in FIG. 3. The records in the directory 11, apart from the password PASSW1, are transmitted through an output 21 to the computer terminal D2. In the figure, this data is indicated by POSTS1. In the same way as for the terminal D1, the web browser W2 in the terminal D2 has a menu with buttons for the different records. The subscriber AB2 clicks on a button "e-mail" which provides the e-mail address EMAILO1 activated by the subscriber AB1, which is his office address. The subscriber AB2 can now, in a way known in the art, write an e-mail message, include his document providing product information in this message and transmit it all to the subscriber's AB1 computer terminal D1 in his office. Thus, the transferred A-number TELO1 is a record corresponding to the telephone number TELH2 of the called subscriber AB2. By means of this record it is possible for the subscriber AB2 to get access to the records in the subdirectory 11 of the calling subscriber AB1.

Of course, the subscriber AB2 can now use his knowledge of the subscriber's AB1 records POSTS1 also for other purposes than those described above. For example, the subscriber AB2 can use the subscriber's AB1 IP-address IP1 to transmit information to him over the internet IN1.

According to the examples above, the subscribers AB1 and AB2 do not see the records in each other's subdirectories 11 and 12, respectively, on their screens. They are still able to use the records for making phone calls, sending e-mails, opening a home page, and so on. In some cases, however, it is convenient to be able to read the contents of the records. This applies, for example, to the subscriber's name NAME1 and NAME2, or one of his telephone numbers TELH1 or TELH2, for example to pass it on to a third person. By clicking with the mouse on their respective screens the subscribers AB1 and AB2 can display the contents in the data sets POSTS1 and POSTS2, respectively, on the screens.

Transfer of e-mail when the subscriber has activated another address

In the example above, the e-mail message was transferred during the call between the subscribers AB1 and AB2. Another situation may arise, if it takes quite a long time for the subscriber AB2 to retrieve the written product information requested by the subscriber AB1. The latter leaves work but first activates his home telephone number TELH1, as indicated by an arrow 23 in FIG. 2, and his private e-mail address EMAILH1, as indicated by an arrow 19. As mentioned above, the subscriber AB1 has a telephone T3 and a computer terminal D3 at home, and the home telephone number TELH 1 goes to the telephone T3. The subscriber AB2 during the phone call retrieved the subscriber's AB1 office e-mail address EMAILO1. He now enters this address and sends off his e-mail message with the included document to the subscriber AB1 in a way known in the art, as shown in FIG. 2. The web browser searches for the address EMAILO1 and finds it in the subscriber's AB1 subdirectory 11, as indicated by an arrow 25 in FIG. 3. The address is automatically changed to the activated e-mail address EMAILH1. The subscriber AB1 can open the document and read it, for example, on his computer terminal D3 at home. It should be observed that the subscriber AB2 does not have to know if the subscriber AB1 has activated his other e-mail address or not.

Telephone call and confidential information through the data network

Some of the information found on the servers in a data network can be of a personal, confidential character, and the subscribers only want to show this information to trusted persons. This may be information concerning the subscriber's credit card and may be found on the subscriber's home page on the server SR1.

The situation may be the same as in one of the previous examples, that the subscriber AB1 calls the subscriber AB2, who is informed about the subscriber's AB1 home number through calling line identification. The calling line identity information is transferred to the computer terminal D2 and the caller's IP-address IP1 is obtained through a request to the directory DS1. The called subscriber AB2 sends a permission to show a confidential document to the calling subscriber AB1. Through his computer terminal D2 the subscriber AB2 sends an instruction to the server SR1 holding his home page that the confidential document may be transmitted to the computer terminal D1 of the calling subscriber AB1 having the dynamic address IP1. The server has a normal state in which the confidential information is not shown to any one. When the call between the subscribers AB1 and AB2 is ended, the server SR1 returns to its normal state.

The computer terminals have a telephone directory service that may comprise the possibility to pre-program the documents that are to be shown to certain selected subscribers. The authorization of the callers may be verified by comparing the phone number associated with the ongoing call to the phone numbers of the selected subscribers found in the computerized phone directory of the subscriber AB2.

All subscribers connected to the telecommunications system TS1 and having a telephone and a computer terminal, like the subscribers AB1 and AB2, may have access to the contents of the directory DS1. By means of this they can communicate with each other in a simple way, as described, and utilize each other's different possibilities for communication. This is possible since the directory DS1 is public and since the telephone and the computer terminal can exchange the telephone numbers between them in both directions. The methods described above will be described briefly in connection with the flowchart shown in FIG. 4. The public directory DS1 is connected to the internet IN1 according to a method step 41. According to a step 42 the subscribers in the system, for example the subscribers AB1 and AB2, enter their records R in their respective subdirectories 11 and 12. The subscribers activate some of their records, for example, the subscriber AB2 activates the telephone number TELO2 to his office, according to a step 43. According to a step 44 the subscriber AB1 calls, from his telephone T1, the subscriber AB2 on his telephone number TELH2, which, according to a step 45, is redirected to the office telephone number TELO1, and a telephone connection is established. The subscriber AB1 makes a request for the addresses of the subscriber AB2 through his computer terminal D1, according to a step 46, and receives these addresses to his terminal according to a step 47. The subscriber AB1, according to a step 48, opens the subscriber's AB2 home page by means of the address URL2.

When the connection is established according to step 45, the telephone number TELO1 of the calling subscriber AB I is transferred to the called subscriber AB2 according to a step 51. The subscriber AB2, according to a step 52, makes a request from his computer terminal D2 for the addresses of the calling subscriber AB1. According to a step 53 the addresses are transferred, together with other records, to the computer terminal D2 of the called subscriber AB2. The called subscriber AB2 finds the e-mail address EMAILO1 used by the subscriber AB1 in his office and, according to a step 54, utilizes this address to send an e-mail. According to a step 55 the e-mail address EMAILO1 in the subdirectory 11 is redirected to the e-mail address EMAILH1 used privately by the subscriber AB1. The subscriber AB1 opens the e-mail on his computer D3 at home.

Request to be called through home page

The first subscriber AB1 searches and finds the home page HS2 of the second subscriber AB2, which shows, among other things, a field "Call me". The first subscriber marks this field with his mouse to be called by the subscriber AB2. A request to be called is then transmitted to the server SR1 on which the home page HS2 is found. This request comprises, among other things, the IP-address IP1 of the first subscriber, and a calling function is activated in the server SR1. The server uses the IP-address IP1 in a request to the directory DS1, which returns the unique identification ID1 of the first subscriber to the server. Data concerning the request from the subscriber AB1, such as the identification ID1, to be called, is stored. When the second subscriber AB2 is ready to call, he uses the calling function of his computer terminal D2 to retrieve the first subscriber's AB1 telephone number TELO1 from the directory DS1. In this, the unique identification ID1 is used, and the second subscriber does not have to see the telephone number of the first subscriber AB1. The call can be set up automatically.

In the description of the embodiments in connection with FIG. 2, the subscribers AB1 and AB2 have the telephones T1 and T2, respectively, which are connected to the separate telephone network PSTN1. This telephone network, according to one embodiment, is a terrestrial telephone network, but may be a mobile telephone network or a combination of the two, according to another embodiment. The data communications network in the embodiment is an internet, but other data communications network may be used as well, for example, America Online or the X.25-network used by the banks.

Figure 5:
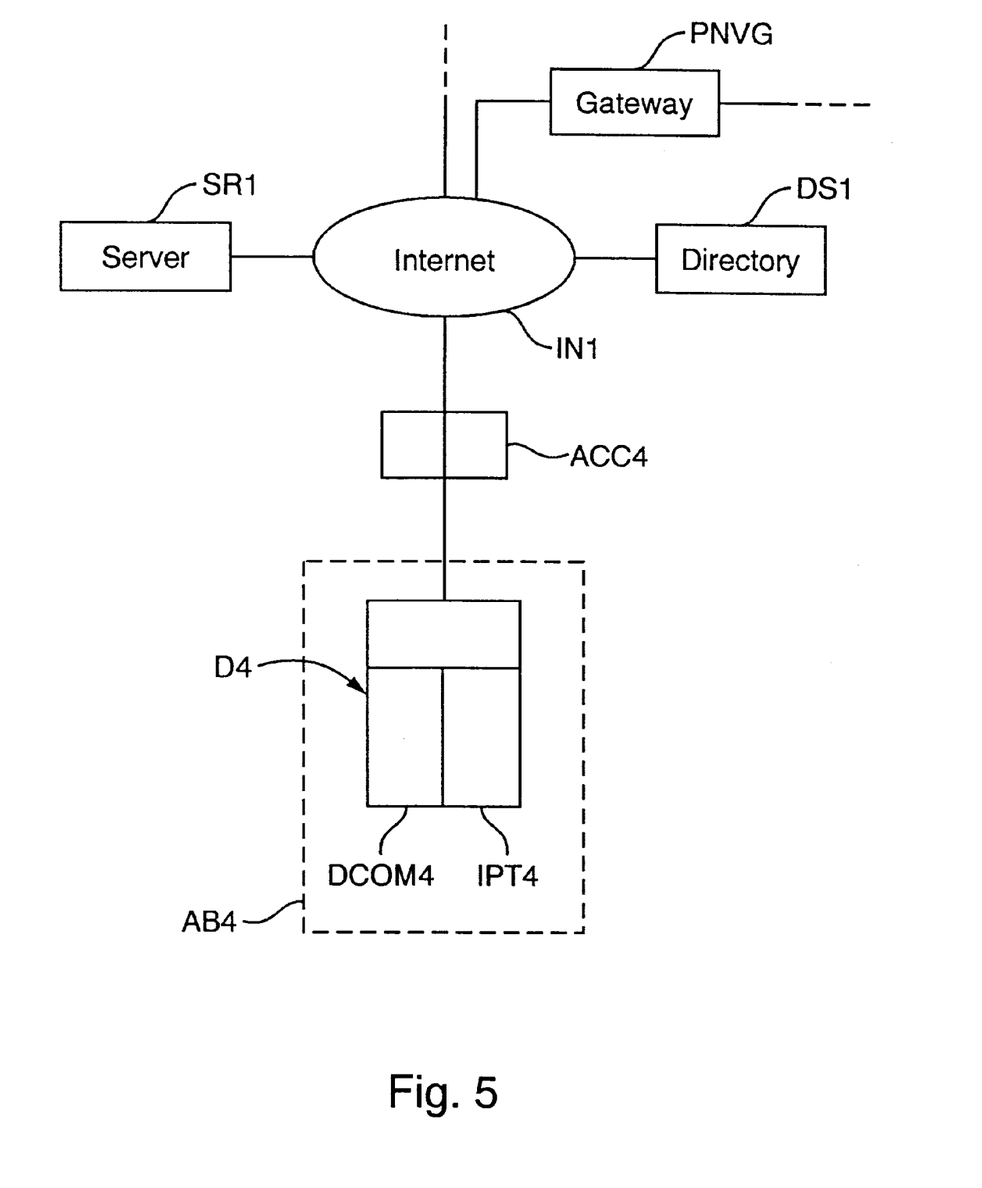
FIG. 5 is a block diagram of an embodiment of the invention.

Another embodiment is shown in FIG. 5. A subscriber AB4 is connected to the above-mentioned internet IN1 with its server SR1 and the public directory DS1, through an access device ACD4. The subscriber AB4 has a computer terminal D4 comprising a part DCOM4 for data communication and an IP-telephone IPT4 (Internet Protocol Telephone) for speech communication. The subscriber AB4 has a subdirectory 13, as shown in FIG. 3, and this subdirectory, among other things, comprises a unique identification ID4, a password PASSW4 and a telephone number TELIP4 to the IP-telephone IPT4. The subscriber AB4 uses his IP-telephone in the same way as described above for the telephones T1, T2 and T3 of the subscribers AB1 and AB2, and the telephone number TELIP4 can be used by the other subscribers as described above. The communication between the IP-telephone IPT4 and, for example, the telephone T2 of the subscriber AB2 is transmitted through the gateway PNVG mentioned above. In IP-telephony the IP-address of the receiver and also a gate number for the IP-telephone of the program must be known. This information is normally stored in a separate server, in which the user is identified by a unique name, for example, a telephone number or an e-mail address. Thus, the telephone number TELIP4 is the identifier used by the IP-telephony system and does not have to be a conventional telephone number.

In the following, some additional examples of variations of the described invention will be mentioned. In connection with FIG. 3 it was mentioned that the subscribers have a URL address to a home page. The subscribers can have several home pages reached under different URL addresses, which can be activated in the same way as described for different telephone numbers. Each of the subscribers in the examples has been assigned an IP-address. Such an address can be either fixed or dynamic. A fixed IP-address is allocated to a terminal that is permanently connected to the internet, for example through a local area network LAN. A dynamic IP-address is assigned for temporary use, for example to a subscriber calling a modem pool at an operator's site. A subscriber, for example the subscriber AB1, can have a public password for encrypted communication, "Public Key Encryption", which is stored in the subscriber's subdirectory. The subscriber AB2 uses the subscriber's AB1 public password to send encrypted e-mail that only the subscriber AB1 is to be able to read. Public passwords are described in a textbook by William Stallings: "Data and Computer Communications", Prentice-Hall Inc, 1997, fifth edition, section 18.4. This book also mentions the above-mentioned address Universal Resource Identifier, in section 19.4.

What is claimed is:

1. An apparatus in a telecommunications system, comprising:

at least one telecommunications network for the transfer of spoken information and data information;

an access device for connecting subscribers to the telecommunications network, each one of the subscribers having a telephone and an apparatus for data communication connected to each other;

a directory comprising different records for the respective subscribers; wherein a first one of the subscribers has means for establishing a connection to a second one of the subscribers by means of a first one of the records of the second subscriber, and wherein the directory is public;

means for searching, in the public directory, at least a second one of the records of the second subscriber by means of the first record of this subscriber; and means for transferring the second record to the first subscriber.

2. An apparatus according to claim 1 wherein the directory includes records that are telephone numbers, and the telephone and the apparatus for data communication of the respective subscriber are arranged to transmit the records that are telephone numbers to and from each other.

3. An apparatus according to claim 1, wherein the telecommunications network comprises a data communication network and a telephone network, and the public directory is connected to the data communication network.

4. An apparatus according to claim 1, wherein the public directory has a public subdirectory for the respective subscriber.

5. An apparatus according to claim 1, wherein the respective subscriber has apparatuses for entering predetermined records, associated with the subscriber, in the public directory, through the telecommunications network.

6. An apparatus according to claim 1, wherein the public directory has at least two records of the same kind for one of the subscribers, and the apparatus further comprises means (DI) through which the subscriber can activate one of the at least two records.

7. An apparatus according to claim 1, wherein one of the records in the public directory comprises a URL (Uniform Resource Locater) address and the apparatus comprises means enabling the subscribers to retrieve a home page from a server connected to the telecommunications network, by means of this address.

8. An apparatus according to claim 1, wherein the telephone is an IP-telephone comprised together with the apparatus for data communication in a computer terminal and connected to the network for data communication.

9. The apparatus of claim 1, wherein the directory includes records that are identities for the respective subscribers.

10. The apparatus of claim 1, wherein the directory includes records that are addresses for the respective subscribers.

11. The apparatus of claim 6, wherein the at least two records are e-mail addresses.

12. The apparatus of claim 6, wherein the at least two records are telephone numbers.

13. An apparatus in a telecommunications system comprising:

at least one telecommunications network for the transfer of spoken information and data information;

an access device for connecting subscribers to the telecommunications network, each one of the subscribers having a telephone and an apparatus for data communication connected to each other;

a directory comprising different records for the respective subscribers; wherein a first one of the subscribers has means for establishing a connection to a second one of the subscribers by means of a first one of the records of the second subscriber, and wherein the directory is public;

means for transmitting a first record corresponding to the record of the first subscriber to the second subscriber;

means for searching, in the public directory, at least a second one of the records of the first subscriber by means of the first record (TELH1) of the first subscriber (AB1); and means for transferring the second record of the first subscriber to the second subscriber.

14. The apparatus of claim 13, wherein the directory includes records that are identities for the respective subscribers.

15. The apparatus of claim 13, wherein the directory includes records that are addresses for the respective subscribers.

16. A method in a telecommunications system, the system comprising:

at least one telecommunications network for the transfer of spoken information and data information;

an access device for connecting subscribers to the telecommunications network, the subscribers having a telephone and an apparatus for data communication connected to each other;

the method comprising the following steps:

connecting a public directory to the telecommunications network; and entering records of the subscribers in the public directory, involving some of the subscribers entering predetermined records concerning themselves.

17. A method according to claim 16, further comprising the following steps:

establishing a connection in the telecommunications network from a first one of the subscribers to a second one of the subscribers by means of a first one of the records of the second subscriber;

searching at least a second one of the records of the second subscriber in the public directory by means of the first record of this subscriber; and transmitting (47) the at least second record to the first subscriber.

18. A method according to claim 17, wherein the telecommunications network comprises a data communication network and a telephone network, and the connection is a telephone connection, the method further comprising the steps of:

establishing the connection by means of a telephone number of the second subscriber;

transmitting this telephone number from the telephone to the apparatus for data communication of the first subscriber; and transmitting the telephone number to the directory through the data communication network.

19. A method according to claim 16, further comprising the following steps:

establishing a connection in the telecommunications network from a first one of the subscribers to a second one of the subscribers by means of a first one of the records of the second subscriber;

transmitting a first record of the first subscriber corresponding to the first record of the second subscriber to the second subscriber;

searching at least a second one of the records of the first subscriber in the public directory by means of the first record of this subscriber; and transmitting the second record of the first subscriber to the second subscriber.

20. A method according to claim 19, wherein the telecommunications network comprises a data communication network and a telephone network, and the connection is a telephone connection, the method further comprising the steps of establishing the connection by means of a telephone number of the second subscriber;

transmitting a telephone number of the first subscriber to the telephone of the second subscriber through the telephone network;

transmitting the telephone number of the first subscriber from the telephone of the second subscriber to his apparatus for data communication; and transmitting the telephone number of the first subscriber to the public directory through the data communication network.

21. A method according to claim 16, wherein the public directory has at least two records of the same kind for one of the subscribers, the method comprising the step of activating of one of these records.

22. A method according to claim 16, further comprising the step of connecting a public subdirectory for the respective subscriber in the public directory.

23. A method according to claim 16, wherein the telecommunications network comprises a data communication network and a telephone network, the method comprising the step of connecting the public directory to the data communication network.

24. A method according to claim 16, further comprising:
   entering at least two records (TELH1, TELO1) of the same kind for one of the subscribers (AB1) into the public directory (DS,DS1); and
   activating one of the records.

25. A method according to claim 16, wherein a server comprises home pages of the subscribers and is connected to the telecommunications network, the method further comprising the steps of:
   entering a URL address of one of the subscribers as one of the records in the public directory;
   retrieving the home page of this subscriber by means of the URL (Uniform Resource Locater) address.

26. The method of claim 16, wherein the records are identities of the subscribers.

27. An apparatus in a telecommunications system comprising:
   at least one telecommunications network for the transfer of spoken information and data information;
   an access device for connecting subscribers to the telecommunications network, each one of the subscribers having a telephone and an apparatus for data communication connected to each other;
   a directory comprising different records for the respective subscribers; and
   a server holding home pages for the subscribers,
   wherein a first of the subscribers has means for establishing a connection to the server and reading the home page of a second one of the subscribers, and the apparatus further comprises means by which the first subscriber can request, through the home page of the second subscriber, to be called by the second subscriber, upon which request a first one of the records of the first subscriber is transmitted from the directory to the server, wherein:
   the directory (DS,DS1) is public;
   the server has means for searching, in the public directory, a telephone number of the first subscriber by means of the first record of the first subscriber;
   and the apparatus further comprises means for transferring the telephone number of the first subscriber to the second subscriber.

28. The apparatus of claim 27, wherein the directory includes records that are identities for the respective subscribers.

29. The The apparatus of claim 27, wherein the directory includes records that are addresses for the respective subscribers.

* * * * *